Oct. 7, 1958 E. A. BROWN 2,855,586
MAGNETIC CORE LOGICAL DEVICE
Filed June 26, 1956
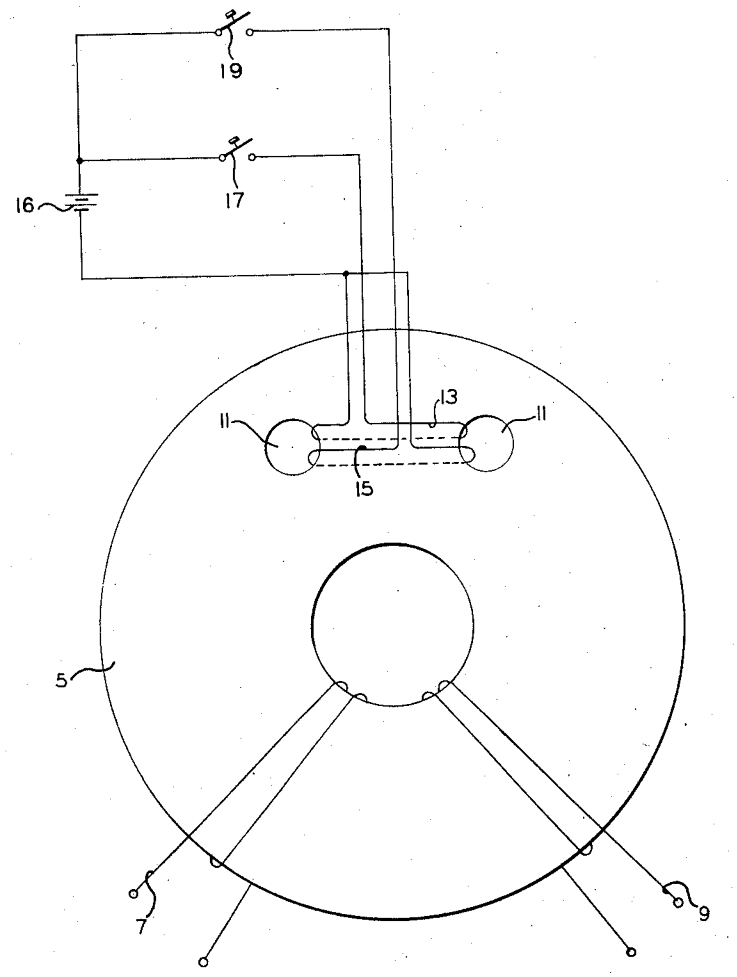
INVENTOR.
EDGAR A. BROWN
BY Paul M. Brannen
AGENT United States Patent Office 2,855,586

Patented Oct. 7, 1958

2,855,586

MAGNETIC CORE LOGICAL DEVICE

Edgar A. Brown, Owego, N. Y., assignor to International Business Machines Corporation, New York, N. Y., a corporation of New York Application June 26, 1956, Serial No. 593,897

5 Claims. (Cl. 340—174)

This invention relates to magnetic core logical devices, and particularly to a magnetic core logical device in which a single magnetic core structure is enabled to function as an "Exclusive Or" logical device, as well as an information storage device.

In the carrying out of logical operations, it is at times necessary to provide means which is responsive to one or the other of two input conditions, which exist at different times, but which is non-responsive to both input conditions existing simultaneously. Such a device is known in the art as an "Exclusive Or" device.

Previously, such devices have been provided by suitable designs of relay switching circuits, diode switching circuits and by differential windings on relays or transformers. None of these prior arrangements have provided both an "Exclusive Or" device and an information storage device as a simple unit or element.

It is accordingly an object of the present invention to provide an improved magnetic core logical device which is capable of functioning as an "Exclusive Or" logical device and as an information storage device.

Another object of this invention is to provide an improved magentic core logical device which is capable of storing information which may be repetitively interrogated by energization of one or the other of two sample windings at different times, but which is non-responsive to concurrent energization of the two sample windings.

A further object of the invention is to provide an improved logical device and information storage device utilizing a single magnetic core.

Other objects of the invention will be pointed out in the following description and claims and illustrated in the accompanying drawing, which discloses, by way of example, the principle of the invention and the best mode, which has been contemplated, of applying that principle.

The single accompanying drawing is a diagrammatic view of a magnetic core structure forming a preferred embodiment of the invention.

Briefly described, the invention contemplates the provision of a core of suitable magnetic material, having a conventional input winding for setting the core in one or the other of its two stable remanent flux states, and having a conventional output winding in which voltages are induced as a result of net flux changes in the core. Additionally, a first and a second auxiliary winding are provided, each being arranged to link the same predetermined portion of the core, this predetermined portion being at substantially right angles to the principal flux path in the core.

The auxiliary windings are proportioned and arranged so that the auxiliary flux set up in the core by the energization of one of the two windings is opposite in sense and equal in magnitude to the auxiliary flux produced by energization of the other winding. Hence, when both auxiliary windings are energized, the fluxes produced by the windings cancel each other. However, when only one of the auxiliary windings is energized, the auxiliary flux produced thereby is effective to produce an output voltage pulse in the output winding, the polarity of the output pulse being dependent only upon the sense of the remanent flux in the core, and being independent of the polarity of the sampling winding energy.

Moreover, successive output pulses may be produced in the output winding by repetitively energizing either of the two auxiliary windings but not both, without changing the sense of the remanent flux in the core.

Referring now to the drawing, there is shown a core 5 of magnetic material, which may be of the conventional toroidal type as shown, or may be of any suitable configuration to form a closed loop.

A conventional input winding 7 is provided for the core 5, which winding, when energized from a suitable source of energy, not shown, is effective to set the core in one or the other of its two stable remanent flux states in accordance with the relative polarity of the energy supplied to the winding 7.

An output winding 9 is also provided for core 5, output voltage pulses being induced in the output winding in accordance with changes in the net flux in the core.

The core 5 is provided with a pair of spaced openings 11, drilled or otherwise formed in the core material, so that the portion of the core between the openings is at right angles to the principal flux path of the core, which is substantially concurrent with the center line of the core.

A first auxiliary winding 13 and a second auxiliary winding 15 are wound through the openings 11 in core 5 and about the portion of the core between the openings as shown, so that the axes of the windings 13 and 15 are substantially normal to the principal flux path of core 5. Each of these auxiliary windings is of the type shown and described in a copending application Serial No. 383,568, filed on October 1, 1953, on behalf of Edgar A. Brown, for Non-Destructive Sensing of Magnetic Cores.

Windings 13 and 15 are connected to a suitable source of energy, such as the battery 6, through switches 17 and 19, respectively. As described in detail in the aforementioned copending application, the energization of either winding 13 or 15, by closing the associated switch 17 or 19 respectively, will be effective to create an output voltage pulse in winding 9, with the output polarity being dependent only upon the sense of the remanent flux in the core.

If, however, switches A and B are simultaneously operated, the auxiliary fluxes created by windings 13 and 15 will oppose each other, and, being of equal magnitude, will cancel each other. Thus there will be no net flux change in the core, and hence no output voltage will be induced in winding 9.

It is apparent from the foregoing that a magnetic core device arranged in accordance with this invention is capable of not only storing information, but also providing repetitive readout of the information by the energization of either one of two sampling windings but not by concurrent energization of both windings.

The transverse auxiliary or sample windings 13 and 15 are shown in the drawing as passing through openings 11 which pass through the core in an axial direction. However, the openings 11 and hence the transverse windings may be positioned radially or at any angle between a radial and an axial alignment. Also, the windings 13 and 15 may be of the bifilar type, wound concurrently, or may be separate windings as shown.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic core logical device comprising, in combination, a closed core of magnetic material, and winding means mounted on said core including a first auxiliary winding effective when energized to create an auxiliary flux in said core at substantially right angles to the principal flux path in said core, and a second auxiliary winding effective when energized to create an auxiliary flux in said core at substantially right angles to the principal flux in said core, the auxiliary fluxes created by said first and said second windings being substantially equal in magnitude and of opposite relative polarity, and flowing in the same path and means for individually energizing said first and second auxiliary windings.

2. A magnetic core logical device comprising, in combination, a closed core of magnetic material having two stable remanent flux states, an input winding linking said core and effective when energized to set the core in one or the other of its two stable remanent flux states in accordance with relative polarity of the energy supplied to the input winding, an output winding linking said core and having voltages induced therein in accordance with changes in the net flux in said core, an auxiliary flux path in said core substantially normal to the principal flux path in said core, a first auxiliary winding linking said auxiliary flux path and effective when energized to create auxiliary flux of predetermined magnitude and a given relative polarity in said auxiliary flux path, a second auxiliary winding linking said auxiliary flux path and effective when energized to create auxiliary flux in said auxiliary flux path of said predetermined magnitude and opposite relative polarity with respect to the auxiliary flux created by said first auxiliary winding, and means for individually energizing said first and said second auxiliary windings.

3. A pulse transfer device comprising a magnetic circuit having a principal flux path and an auxiliary flux path substantially normal to the principal flux path, input winding means associated with said magnetic circuit for establishing flux in said principal flux path, output winding means associated with said magnetic circuit for detecting changes in the net flux in said magnetic circuit, a first and a second sampling winding each linking said auxiliary flux path, each of said sampling windings being effective when energized to create auxiliary flux of a predetermined magnitude in said auxiliary flux path, the sense of the flux created by said first sampling winding being opposite to the source of the flux created by said second sampling winding, means for individually energizing said first and said second sampling windings.

4. A magnetic core device for storing information and performing a logical operation comprising a closed core of magnetic material having a first and a second stable remanent flux state and having an auxiliary flux path substantially normal to the principal flux path in said core, an input winding linking the principal flux path of said core and effective when energized to set the core in one or the other of its two stable remanent flux states, according to the relative polarity of the energy supplied to the input winding, an output winding linking the principal flux path of said core and effective to have output voltages induced therein in response to changes in the net flux in the core, a first and a second sampling winding concurrently wound to link said auxiliary flux path, each of said sampling windings being effective when energized to create auxiliary flux in said auxiliary flux path which is effective to induce an output voltage in said output winding indicative of the sense of the remanent flux in said core, the auxiliary fluxes created by said sampling windings being equal in magnitude but opposite in sense, whereby concurrent energization of both of said sampling windings is ineffective to induce a voltage in said output winding, and means for individually energizing said first and said second sampling windings.

5. A magnetic core device for storing information and performing a logical operation comprising a closed core of magnetic material having a first and a second stable remanent flux state, a pair of spaced parallel openings in said core passing substantially through the center line of said core, an input winding and an output winding linking said core, a first and a second sampling winding wound through said openings and linking the portion of the core between said openings, and means for at times individually energizing said sampling windings, the parts being proportioned and arranged so that the flux created by energization of said first sampling winding is equal in magnitude and opposite in relative sense to the flux created by energization of said second sampling winding.

References Cited in the file of this patent

UNITED STATES PATENTS

| | | |
|---|---|---|
| 2,695,993 | Haynes | Nov. 30, 1954 |
| 2,818,555 | Lo | Dec. 31, 1957 |

OTHER REFERENCES

"The Transfluxor," by J. A. Rajchman and A. W. Lo, March 1956, Proceedings of the I. R. E., pp. 321 to 332 of vol. 44, issue 3.